United States Patent [19]

Upham et al.

[11] 4,324,407

[45] Apr. 13, 1982

[54] PRESSURE ACTUATED METAL-TO-METAL SEAL

[75] Inventors: Neil R. Upham, Jackson; Russell L. Rogers, Munith, both of Mich.

[73] Assignee: Aeroquip Corporation, Jackson, Mich.

[21] Appl. No.: 194,609

[22] Filed: Oct. 6, 1980

[51] Int. Cl.³ .......................... F16J 15/06; F16J 15/48
[52] U.S. Cl. ..................................... 277/27; 277/103; 277/236
[58] Field of Search ............... 277/102, 103, 116.2, 277/117, 123, 125, 115, 27, 236; 166/182, 187, 88, 191, 89, 195, 196

[56] References Cited

U.S. PATENT DOCUMENTS

| 2,703,722 | 3/1955 | Christophersen | 285/129 |
|---|---|---|---|
| 2,851,291 | 9/1958 | Payne | 277/102 X |
| 2,992,840 | 7/1961 | Reynolds et al. | 285/332.3 |
| 3,016,249 | 1/1962 | Contreras et al. | 285/336 |
| 3,046,621 | 7/1962 | Morton | 277/102 X |
| 3,129,948 | 4/1964 | Kendall | 277/103 X |
| 4,084,843 | 4/1978 | Gassert | 285/105 |
| 4,109,942 | 8/1978 | Morrill | 285/140 |
| 4,127,168 | 11/1978 | Hanson et al. | 166/191 X |
| 4,146,254 | 3/1979 | Turner et al. | 285/105 |

Primary Examiner—Robert S. Ward, Jr.
Attorney, Agent, or Firm—Beaman & Beaman

[57] ABSTRACT

A seal assembly permitting a conduit member to be sealed within a bore in metal-to-metal relationship wherein a seal ring of a conical configuration in the relaxed state is deformed toward a flattened condition to increase its radial dimension and establish sealing under the influence of the pressurized medium of the system with which the seal assembly is employed. The relaxed state of the seal ring permits insertion and removal of the conduit into the bore without scoring, and the seal ring characteristics establish effective high pressure sealing while capable of accomodating limited lateral and axial displacement.

9 Claims, 4 Drawing Figures

PRESSURE ACTUATED METAL-TO-METAL SEAL

BACKGROUND OF THE INVENTION

Offshore oil and gas drilling operations utilize pressurized fluid systems for a number of applications and purposes, and such fluid systems employ a variety of couplings and connections. One type of connection is known as a "stab" connection wherein a conduit is telescopingly received within a cylindrical bore and the conduit is then sealed with respect to the bore after insertion is completed. Oil exploration and drilling apparatus often employs heads or manifolds on which a plurality of conduits are mounted having stab type seal units wherein a plurality of fluid type connections are simultaneously achieved. As such connections often occur several hundreds of feet below the water surface, and may be exposed to very high pressures, it is most important that the connections be highly dependable and effective, and require a minimum of maintenance.

Known seal assemblies for use in such applications have not been completely satisfactory. For instance, previous seal assemblies may score the bore as the stab conduit is being received therein, and some seal assemblies require close regulation of the degree of insertion of the seal assembly into the bore in order to produce an effective seal. Such accuracy under the conditions of installation are often very difficult to achieve. Further, lateral or angular variations may occur between the stab conduits of a manifold and their bores and such conditions often result in leakage with known seal devices.

Effective metal-to-metal sealing is achieved by various types of seal members, and the conical ring type seals marketed by the assignee under the trademarks CONOSEAL and CONOMASTER have proven effective and are widely used, samples of this type of seal ring being shown in the assignee's U.S. Pat. Nos. 2,703,722; 2,992,840 and 3,016,249. Conical seal rings have been used in oil well pipe suspension systems wherein mechanical means for deforming the seal are employed, such as shown in U.S. Pat. No. 4,109,942.

It is known to utilize the pressure within a conduit system to augment retention of interconnected coupling parts, and in U.S. Pat. Nos. 4,084,843 and 4,162,254 apparatus is disclosed wherein retaining members are deformed under the influence of the pressurized medium to prevent a conduit inadvertently separating from a bore.

However, seal assemblies have not been produced which will automatically function in response to pressurizing of the conduit system wherein a metal-to-metal seal is achieved which will not score the receiving bore, and wherein misalignment will not adversely affect the seal.

It is an object of the invention to provide a stab seal assembly wherein a metal sealing element is employed to produce a metal-to-metal seal capable of withstanding high fluid pressures, and yet no scoring of the receiving bore occurs during insertion or removal of the seal assembly and associated conduit.

Another object of the invention is to provide a seal assembly such as used in sub-sea tubing hanger applications which permits limited lateral and angular displacement without affecting the seal.

A further object of the invention is to provide a metal-to-metal seal which is automatically achieved under the influence of the pressurized medium of the conduit system, and wherein no interference fitting is required, and wherein the pressure of the conduit maintains the seal and upon release of the pressure the male stab coupling may be withdrawn from the receiving bore without scoring.

Yet a further object of the invention is to provide a seal assembly which produces an effective seal between a conduit and a receiving bore at various degrees of insertion of the conduit within the bore, and wherein the relationship between the conduit and bore is not critical with respect to the extent of insertion.

In the practice of the invention it is desired to establish a sealed relationship between a cylindrical bore and a conduit which is received within the bore. The conduit includes a seal assembly wherein a conical metal seal ring is interposed between an annular anvil ring and piston ring. Upon the seal assembly being inserted within the bore, and upon pressurization of the system, the piston ring will engage and deform the seal ring in such a manner as to increase the radial dimension of the seal ring to deform the seal ring into metal-to-metal contact with the conduit and bore. Once the seal is established the pressure within the system will maintain the seal ring in engagement with the conduit and bore, and upon release of the pressure of the system, initial withdrawal of the conduit from the bore permits the seal ring to return to its normal relaxed diameter permitting the conduit to be withdrawn from the bore without scoring thereof.

An annular retainer is mounted upon the conduit to maintain the seal assembly thereon, and a releasable wire clip permits the retainer, and assembly, to be removed from the conduit for replacement or maintenance.

BRIEF DESCRIPTION OF THE DRAWINGS

The aforementioned objects and advantages of the invention will be appreciated from the following description and accompanying drawings therein.

DESCRIPTION OF THE PREFERRED EMBODIMENT

Figures 1, 2:
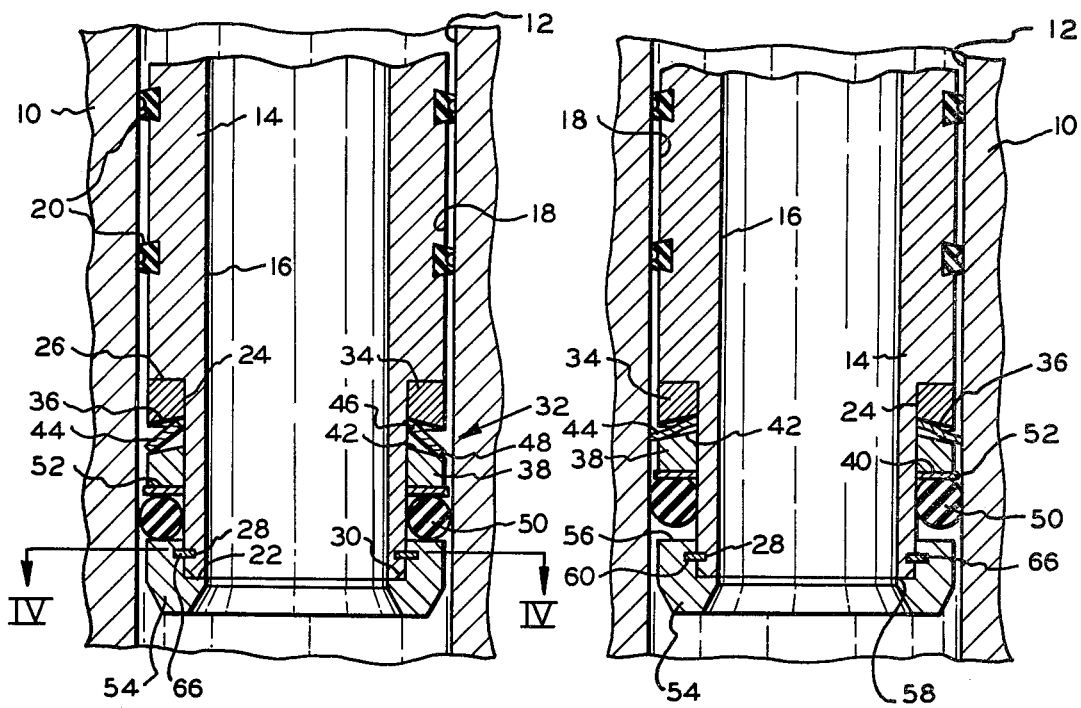
FIG. 1 is an elevational, sectional view of a stab seal assembly in accord with the invention while being inserted into a receiving bore, and prior to pressurization of the conduit system.
FIG. 2 is an elevational, sectional view similar to FIG. 1 illustrating the relationship of the components after pressurization of the system, and illustrating the sealed condition.

With reference to FIGS. 1 and 2, a typical detail is shown of a tubing hanger running tool, as used in the oil drilling art wherein the number 10 represents a fixed manifold having a plurality of cylindrical bores 12 defined therein which communicate with a conduit system which is selectively pressurized, usually with a liquid. The tool also includes a plurality of cylindrical conduits, one of which is shown at 14, which are adapted to be received within a bore 12 in an relatively axially movable telescoping manner as the tool is lowered upon the manifold member 10. Connection means, not shown, interconnect the upper and lower portions of the tool once assembly is completed, and when the conduit systems are pressurized an effective high pressure seal must be established between the conduit 14 and the bore 12.

The conduit 14 may constitute a tubular head or extension of the conduit system with which it is associated, not shown, and includes an internal bore 16 communicating with the end of the conduit, which communicates with the bore 12 when assembled thereto. The conduit 14 includes an exterior cylindrical surface 18 having grooves defined therein for receiving elastomeric annular seal rings 20.

The lower end of the condit 14 is recessed adjacent the end 22 to produce a cylindrical inner surface 24 concentric with the conduit axis, and a radial shoulder 26 intersects surfaces 18 and 24. Additionally, the conduit is provided with an annular groove 28 for receiving a retaining clip, as later described, and the nose of the conduit is formed with a beveled surface at 30.

The seal assembly generally indicated at 32 is mounted upon the inner surface 24, and includes an annular anvil ring 34 having a radial surface engaging the shoulder 26, and an anvil surface 36 of a conical form which converges in an upward direction.

The seal assembly 32 also includes an annular piston ring 38 having a radial pressure face 40 and a seal ring engaging surface 42 which is of a conical configuration and converges in an upward direction and is substantially parallel to surface 36. The outer diameter of both rings 34 and 38 substantially correspond to the diameter of conduit surface 18, and the inner diameter of piston ring 38 is slightly greater than that of inner surface 24 whereby the piston ring is axially translatable upon surface 24.

A metal seal ring 44 is interposed between the anvil ring surface 36 and the piston ring surface 42, and the seal ring 44 is of a conical configuration having inner and outer circular sealing edges 46 and 48, respectively, and these edges are defined by apexes which form the seal with the conduit 14 and member 10. The detail of construction of the seal ring 44 will be appreciated from the assignee's U.S. Pat. Nos. 2,703,722; 2,992,840 and 3,016,249, and the seal ring is formed of a metal which is softer than the metal of the conduit 14, or the member 10, to prevent the seal ring from marring or scoring the bore.

An elastomer O-ring 50 circumscribes the surface 24 below the piston ring 38, and is of such diameter as to engage both the surface 24 and the bore 12, as shown in FIG. 1. An annular backup ring 52 is interposed between O-ring 50 and piston ring face 40, and is of a diameter slightly larger than the piston ring 38 to prevent extrusion of the O-ring past the piston ring.

The aforementioned components are maintained upon surface 24 by an annular retainer cap 54 having a radial shoulder 56 in axial alignment with O-ring 50. The cap 54 also includes a locating shoulder 58 which engages the end 22 of the conduit 14, and an annular groove 60 aligns with groove 28 upon the cap being fully installed upon the conduit.

Figures 3, 4:
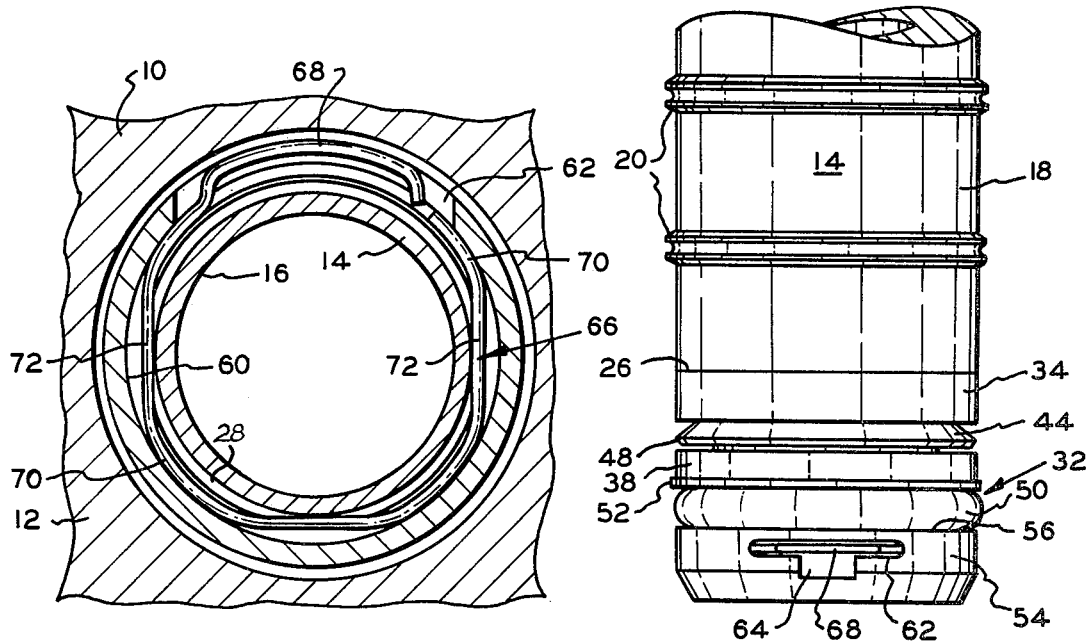
FIG. 3 is a side elevational view of the conduit and seal assembly.
FIG. 4 is a plan, sectional view as taken along Section IV—IV of FIG. 1.

The cap 54 is provided with a radial slot 62 in alignment with groove 60, and the cap is recessed at 64 adjacent slot 62, FIG. 3, to provide a pad for inserting a screwdriver under the cap retaining clip 66.

The clip 66 comprises a wire having the configuration apparent in FIG. 4 and is received within the grooves 28 and 60. The clip includes handle 68 which is received within the retainer cap slot 62, and the configuration of the clip permits the clip portions 70 to be located within groove 60 prior to assembling the cap 54 upon the conduit. When placing cap 54 on the conduit 14 the beveled surface 30 will deflect the clip portions 72 radially outwardly sufficiently to permit the cap to be inserted upon the conduit to the position shown in FIG. 1, and at such time the clip portions 72 will align with, and be received within, the conduit groove 28 thereby effectively retaining the cap upon the conduit. If it is desired to remove the seal assembly 32 from the conduit 14 a screwdriver placed against pad 64 may be inserted under handle 68 and the handle pried from the slot 62 permitting a pliers to grip the handle and the clip may be withdrawn from the grooves 28 and 60 releasing the retaining cap from the conduit.

In operation, the normal relaxed condition of the seal assembly components is that shown in FIG. 1. The seal ring 44 has the normal configuration illustrated in FIG. 1 and the "radial" projection of the seal ring is such that the seal ring circumference 48 is less than the diameter of bore 12, and as the conduit 14 is inserted into the bore 12 the seal ring will not engage or score the bore. After the conduit 14 has been inserted into the bore to the desired extent pressurization of the conduit system will impose an upward force upon the O-ring 50 which raises the piston ring 38 and deforms the seal ring 44 toward a flattened condition, which increases the radial dimensional projection of the seal ring. This deformation of the seal ring 44 permits the circumference 48 to engage bore 12, and the inner surface 46 will engage conduit surface 24, as shown in FIG. 2. The fact that the anvil ring surface 36 and the piston ring surface 42 are substantially parallel to each other assures the desired deformation of the seal ring 44, and as the ring and surfaces converge upwardly once sealing has occurred the pressure acting upon the underside of the seal ring 44 will maintain the seal ring in engagement with the bore and conduit inner surface.

The seal assembly 32 is capable of establishing effective sealing of very high pressures, such as 10,000 psi, and once sealing is achieved the O-ring 50 and piston ring 38 are not required to maintain the desired seal ring configuration. Thus, if leakage occurs past the O-ring the sealing is not affected.

The nature of the seal ring 44 is such that the seal ring is capable of accomodating limited lateral and angular displacement between the bore 12 and conduit 14. For instance, if the conduit 14 is not exactly coaxial with the bore 12 this lateral displacement will not affect the seal, and if the conduit is slightly angularly related to the bore such a relationship can be accomodated by the seal ring without leakage. Testing indicates that lateral offset as great as 0.010 inches and angular deviation of up to 5° is possible without affecting the efficiency of the seal.

When it is desired to withdraw the conduit 14 from the bore 12 the pressure within the conduit system is released, and while the frictional engagement between the seal ring 44 and the bore surface 12 and the surface 24 may be sufficient to maintain the relationship of FIG. 2, immediately upon conduit 14 being raised the seal assembly components will return to the normal or relaxed relationship shown in FIG. 1 permitting the conduit and seal assembly to be withdrawn from the bore without scoring.

As the seal assembly of the invention permits sealing anywhere along the length of the bore 12 the depth of insertion of the conduit 14 into the bore is not critical, and this feature, in conjunction with the automatic operation of the seal assembly, as well as the nonscoring insertion and removal, results in a high pressure metal-to-metal seal suitable for the high performance installations described.

It is appreciated that various modifications to the inventive concepts may be apparent to those skilled in the art without departing from the spirit and scope of the invention.

We claim:

1. A seal assembly for a pressurized system for sealling a cylindrical conduit received within a cylindrical bore comprising, in combination, a tubular body having an axis, a cylindrical outer surface, an end, an inner reduced diameter cylindrical surface defined on said body of lesser diameter than said exterior surface and intersecting said body end, and an abutment defined on said body adjacent said inner surface and axially spaced from said end, an anvil ring circumscribing said inner surface engaging said abutment and having a conical anvil surface facing said body end, an annular conical deformable metal seal ring having inner and outer circular seal surfaces circumscribing said inner body surface having deformable radially expanded and retracted conditions, said seal ring having an expanded radial dimension greater than the radial dimensional difference between said body outer and inner surfaces, an annular piston ring circumscribing said body inner surface and axially displaceable thereon, said piston ring including a conical seal ring engagable surface disposed toward said seal ring and a pressure surface disposed toward said body end acted upon by the pressure within the system to axially displace said piston ring toward said seal and anvil ring, and retaining means mounted on said body limiting movement of said piston ring toward said body end, pressure within the system displacing said piston ring toward said anvil ring to deform said seal ring from its normal retracted condition to its expanded condition whereby said seal ring inner seal surface sealingly engages said body inner surface and said seal ring outer seal surface sealingly engages the bore receiving said body.

2. In a seal assembly as in claim 1, an annular resilient seal ring circumscribing said body inner surface intermediate said piston ring pressure surface and said retaining means having an outer diameter greater than the diameter of said body outer surface for engagement with the bore receiving said body, axial force exerted on said resilient seal ring by the pressure within the system being applied to said piston ring pressure surface by engagement thereof with said resilient seal ring.

3. In a seal assembly as in claim 1, wherein said seal ring converges in a direction away from said body end whereby the pressure acting thereon when sealed tends to maintain the engagement of the seal ring with said inner surface and the bore receiving said body.

4. In a seal assembly as in claim 2, said resilient seal ring comprising an O-ring.

5. In a seal assembly as in claim 1, wherein said abutment defined on said body comprises an annular radial shoulder intersecting said body outer and inner surfaces.

6. In a seal assembly as in claim 1, said anvil ring anvil surface and said piston ring conical seal ring engagable surfaces being substantially complementary in configuration and angular orientation to said body axis.

7. In a seal assembly as in claim 1 wherein said metal seal ring inner and outer seal edges include apexes engaging said body inner surface and the bore receiving the said body.

8. In a seal assembly as in claim 1 wherein said retaining means comprises an annular cap mounted on said body end having a radial surface axially aligned with said piston ring and releasable connection means connecting said cap to said body.

9. In a seal assembly as in claim 8 wherein said connection means includes annular grooves defined in said body inner surface and in said cap, and an accessible wire clip received within said grooves.

* * * * *